(12) United States Patent
Marques et al.

(10) Patent No.: US 7,645,183 B2
(45) Date of Patent: Jan. 12, 2010

(54) MOBILE ROAD OR FLOOR SAW

(75) Inventors: Peter Marques, Wettingen (CH);
Anthony Mertes, Chanhassen, MN (US); Martin D. Marsic, Highland Heights, OH (US); Brian S. Edwards, Amherst, OH (US)

(73) Assignee: Diamond Products, Limited, Elyria, OH (US)

( * ) Notice: Subject to any disclaimer, the term of this patent is extended or adjusted under 35 U.S.C. 154(b) by 514 days.

(21) Appl. No.: 11/571,174

(22) PCT Filed: Jun. 29, 2005

(86) PCT No.: PCT/US2005/023208

§ 371 (c)(1),
(2), (4) Date: Feb. 20, 2007

(87) PCT Pub. No.: WO2006/004889

PCT Pub. Date: Jan. 12, 2006

(65) Prior Publication Data
US 2009/0183722 A1    Jul. 23, 2009

(51) Int. Cl.
*B28D 1/04* (2006.01)
(52) U.S. Cl. .................. 451/11; 451/350; 125/13.01
(58) Field of Classification Search .................. 451/10, 451/11, 350, 352, 353, 294; 125/13.01, 13.03, 125/14; 299/39.1, 39.3, 39.6, 39.9
See application file for complete search history.

(56) References Cited
U.S. PATENT DOCUMENTS

| 2,244,742 A | 6/1941 | Tyson |
|---|---|---|
| 2,783,789 A | 3/1957 | Konway |
| 3,748,789 A * | 7/1973 | Wada et al. .................... 451/14 |
| 3,828,560 A | 8/1974 | Larjukhin et al. |
| 3,893,553 A | 7/1975 | Hansen |
| 4,107,883 A * | 8/1978 | Bein ........................... 451/14 |
| 4,310,198 A | 1/1982 | Destree |
| 4,375,212 A | 3/1983 | Santschi |
| 4,664,645 A | 5/1987 | Muck et al. |
| 4,921,308 A | 5/1990 | Yelton et al. |
| 5,452,943 A | 9/1995 | Campbell |
| 5,680,854 A | 10/1997 | Kingsley et al. |
| 5,690,391 A | 11/1997 | Kingsley et al. |
| 5,724,956 A | 3/1998 | Ketterhagen |
| 5,743,247 A | 4/1998 | Kingsley et al. |
| 5,809,985 A | 9/1998 | Kingsley et al. |
| 5,810,448 A | 9/1998 | Kingsley et al. |
| 6,059,087 A | 5/2000 | Parry |
| 6,131,557 A | 10/2000 | Watson |
| 6,318,353 B1 | 11/2001 | Edwards et al. |
| 6,390,086 B1 | 5/2002 | Collins et al. |
| 7,056,188 B1 * | 6/2006 | Triplett et al. .................. 451/5 |
| 7,117,864 B2 | 10/2006 | Marques et al. |

* cited by examiner

*Primary Examiner*—Robert Rose
(74) *Attorney, Agent, or Firm*—Rankin, Hill & Clark LLP

(57) ABSTRACT

A floor or road saw (20) that includes a multi-speed transmission (24) that includes a neutral position. The transmission does not require the use of belts, polychains, or clutches that require regular maintenance and/or replacement. Moreover, the transmission (24) of the saw (20) may be shifted when the transmission is engaged and shifted through a set of gears (62) in a sequential manner. Further, the transmission is well suited for use on saws where power source or prime mover (22) is disposed parallel to the longitudinal axis of the saw (20).

14 Claims, 11 Drawing Sheets

MOBILE ROAD OR FLOOR SAW

BACKGROUND OF THE INVENTION

1. Field of the Invention

The present invention applies to road or floor saws and more specifically to self-propelled operator-guided or steerable saws supported on a frame with wheels.

2. Description of the Related Art

In the concrete industry, when building bridges, buildings, roads and the like, it is often necessary to pour large horizontal slabs of concrete. Once poured, it is usually necessary to machine the slab. Such machining may include cutting seams completely through the slab (to form expansion joints and to allow for foundation shifting), cutting notches partially into the slab (to create stress cracks along which the slab will split), cutting multiple grooves into the slab to create a high friction surface such as for bridges, grinding the surface of the slab and the like. Concrete saws are also used in the demolition or removal of concrete, such as during the sawing and replacement of bridge decks. Various types of concrete saws may be utilized to carry out these machining and demolition tasks. In larger industrial applications, large self-propelled saws are used that are powered in a variety of manners, such as by gasoline, diesel, electric, propane and natural gas engines mounted on the saw. While performing a cut, the operator controls the direction, cutting speed, cutting depth and the like.

Recently designed concrete saws may include an engine that is mounted with its longitudinal axis in line with the longitudinal axis of the saw. This is in contrast to traditional transverse mounting arrangements. This new arrangement allows the saw to be moved through doorways and other passages that were previously not passable. Even with such an improvement, modern saws lack flexibility in other areas. Transmissions presently in use comprise a number of belts that are subject to wear and breakage, and belts require regular re-tensioning. These belt-driven transmissions do not provide a "neutral" configuration where the transmission is engaged, but the saw blade is not being driven except by means of a conventional clutch that is subject to wear. Often these transmissions operate at only a single speed, and if a multiple speed transmission is provided, it does not afford sequential shifting which avoids over-speeding a blade by accidentally shifting to a very high gear. Also, the prior art transmissions do not provide the convenience of being able to shift gears during the cutting operation (i.e., "on the fly").

Therefore, there exists a need in the art for an improved road or floor saw which includes a transmission with more operational flexibility. Moreover, there exists a need in the art for a concrete saw that is low maintenance that provides a multi-speed transmission.

SUMMARY OF THE INVENTION

The present invention provides an improvement over the prior art by providing a floor or road saw that includes a multi-speed transmission that includes a neutral position. The transmission of the present invention does not require the use of belts, polychains or clutches that require regular maintenance and/or replacement. Moreover, the transmission of the saw may be shifted when the transmission is engaged and shifted through a set of gears in a sequential manner. Further, the transmission is well suited for use on saws where power source or prime mover is disposed parallel to the longitudinal axis of the saw.

In one embodiment the invention provides a concrete saw having a generally rectangular frame having a front end and a rear end, a prime mover or power source supported by the frame and including a rotational output shaft aligned generally with the length of the frame, a gear drive driven by the prime mover rotational output shaft, the gear drive having a transfer gear shaft in rotational communication with a transmission main shaft, wherein the transfer gear shaft is oriented transverse to the prime mover rotational output shaft, and a beltless transmission including the transmission main shaft and an outlet shaft wherein the outlet shaft is in rotational communication with a saw blade.

In another embodiment, the saw includes a dampening mechanism that interrupts direct rotational communication between the prime mover and the saw blade when the saw blade encounters a predetermined degree of rotational resistance. In one such embodiment the dampening mechanism is a resettable disengagement device that completely interrupts communication between the prime mover and the saw blade. In another embodiment the beltless transmission is multi-speed and it includes a selectable full rotational neutral position. In another embodiment, the multi-speed beltless transmission provides sequential shifting, and it is capable of being shifted during cutting operations.

The foregoing and other features of the invention are hereinafter more fully described and particularly pointed out in the claims, the following descriptions setting forth in detail certain illustrative embodiments of the invention, these being indicative, however, of but a few of the various ways in which the principles of the present invention may be employed.

DETAILED DESCRIPTION OF THE INVENTION

Figure 1:
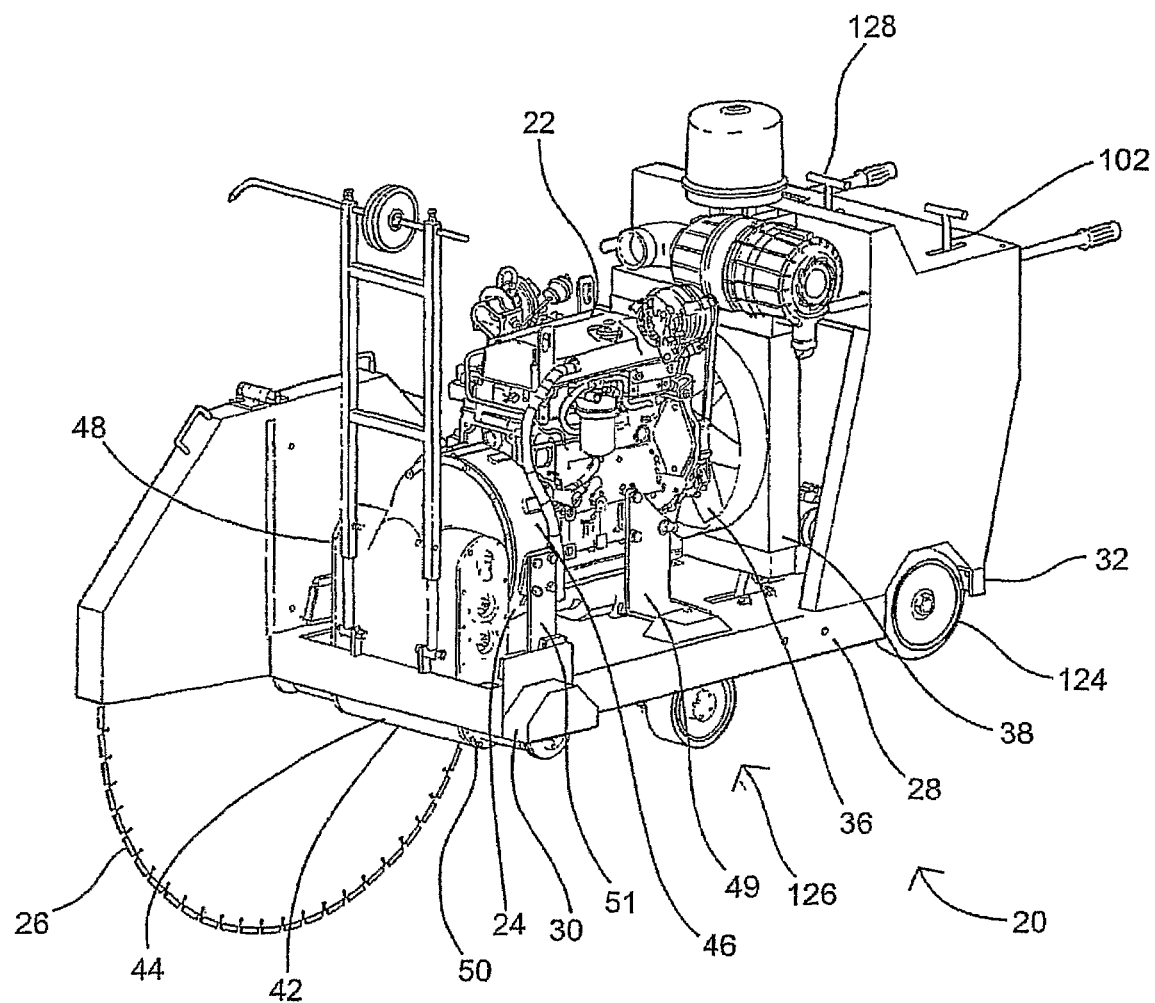
FIG. 1 is a perspective view of a mobile saw of the present invention.

Referring to the drawings, a mobile road or floor saw 20 according to the present invention is illustrated. The saw 20 includes an engine 22 that is used to drive a transmission 24 that in turn drives a saw blade 26. The saw 20 is used to cut seams, notches and/or grooves into or through asphalt, concrete, stone or other similar surfaces.

Figure 2:
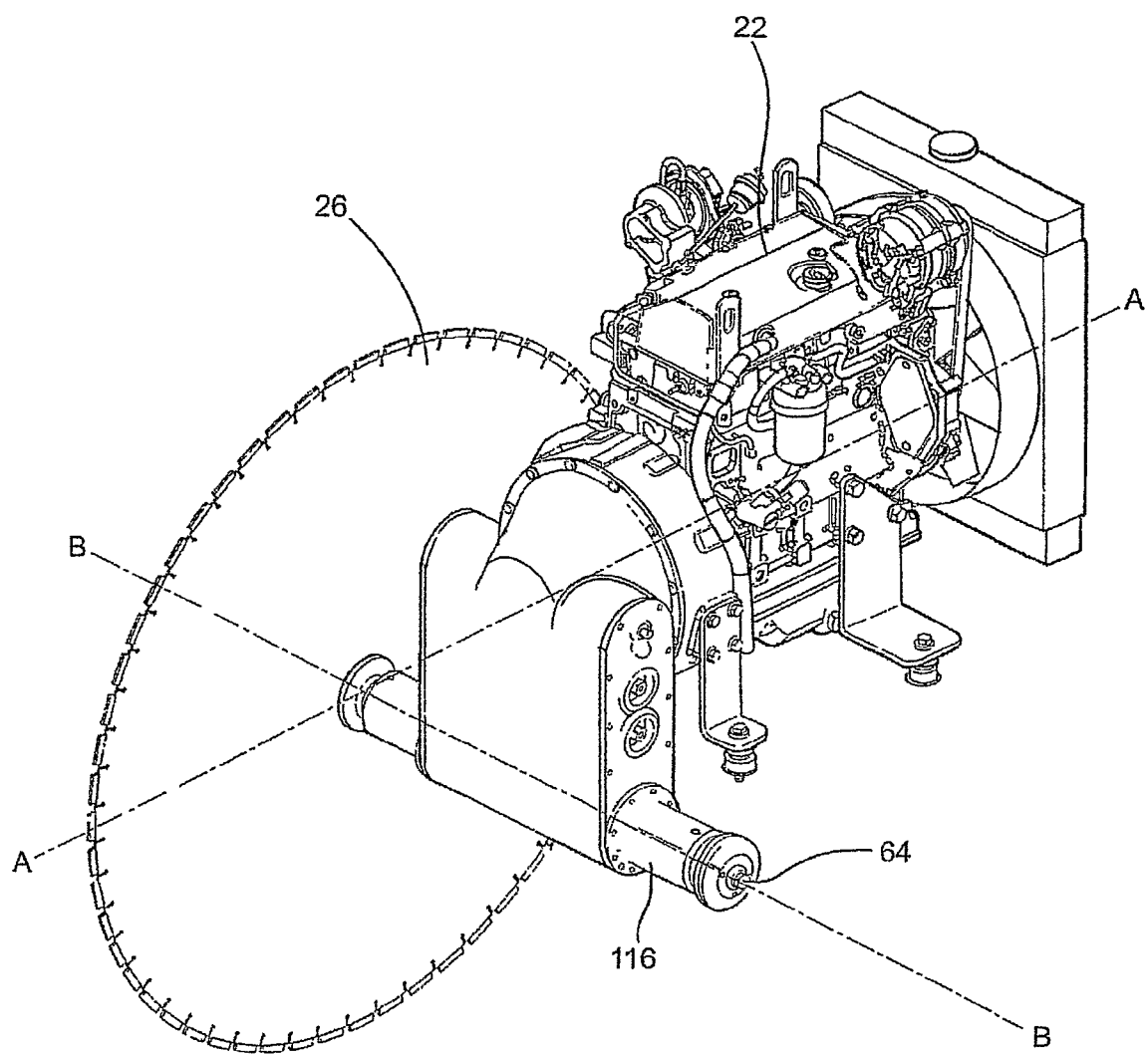
FIG. 2 is a detailed perspective view of the engine, transmission and saw blade of the present invention.
Figure 3:
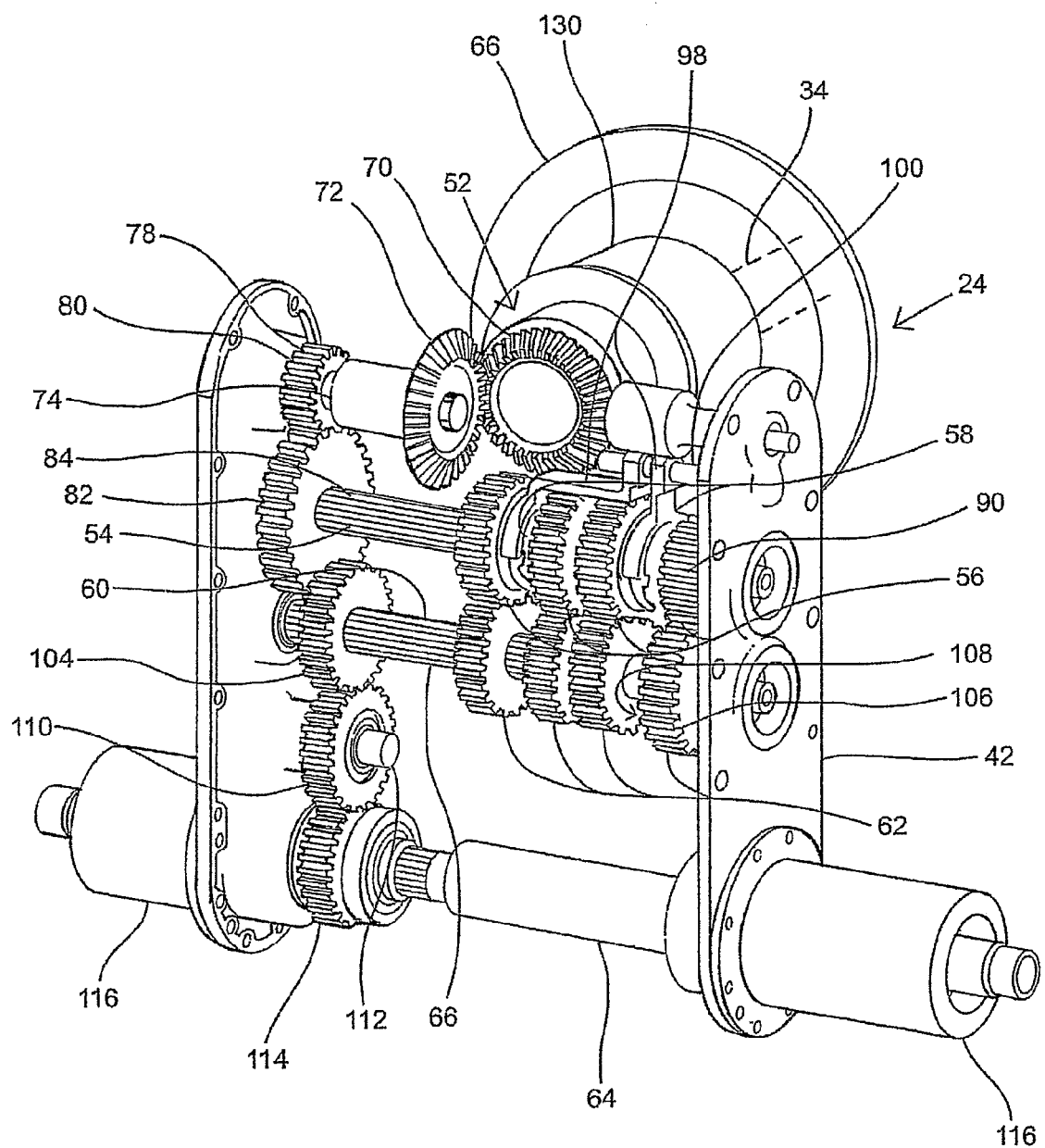
FIG. 3 is a broken away perspective view of the transmission.

Referring to FIGS. 1-3, the engine or prime mover 22 of the saw 20 has a generally rectangular shape and is supported upon a generally rectangular frame 28. The frame 28 has a front end 30 and a rear end 32. The engine 22 is of a type generally known in the art and is oriented with a driven output shaft 34 parallel to an axis "A-A" defined by the length of the rectangular frame 28. The engine 22 includes means for cooling, such as a fan 36 and radiator 38, at an end opposite the output shaft 34 and adjacent to the rear end 32 of the frame 28. It will be appreciated that prime mover 22 may comprise a gasoline, diesel or propane (internal combustion) engine, or an electrical motor.

The output shaft 34 of the engine 22 is in rotational communication with a transmission 24. The entire saw blade drive system, including the transmission 24 is beltless, thus, it does not rely on the use of belts or polychains and pulleys. Additionally, the blade drive system does not require the use of a conventional clutch. The transmission 24 is contained within a housing 42. The housing 42 comprises a face shell 44, a back shell 46 and first and second oblong end plates 48 and 50. The face shell 44 is supported between the first and second oblong end plates 48 and 50. In combination, the first and second end plates 48 and 50, face shell 44 and back shell 46 define the transmission housing 42. The prime mover 22 is attached to frame 28 by support plates 49 and transmission housing 42 is attached to the frame 28 by support legs 51.

Referring specifically to FIG. 3, the transmission 24 includes a transverse gear pairing (gear drive) 52, a main shaft 54 that supports driving gears 56 and engagement dogs 58, a counter shaft 60 that supports driven gears 62 and an outlet shaft 64 as described in more detail below.

The output shaft 34 of the engine 22 is coupled to a flywheel 66, which is in turn coupled to a first gear 70 of the transverse gear pairing 52. Gear teeth upon the first gear 70 of the transverse gear pairing 52 mesh with gear teeth of the second gear 72 in the transverse gear pairing 52. Each of the first gear 70 and second gear 72 include teeth in a spiral bevel configuration. The second gear 72 is supported upon a transfer gear shaft 74 at the end of shaft 74. The transfer gear shaft 74, at a distal end 78, is supported upon the transmission housing 42. A transfer gear 80 is affixed to the transfer gear shaft 74 at the distal end 78. The transfer gear 80 includes teeth that mesh with a main shaft transfer gear 82 upon a main shaft 54 of the transmission 24.

The main shaft 54 of the transmission 24 is oriented parallel to the transfer gear shaft 74 and supports four driving gears 56 and associated engagement dogs 58 as well as the main shaft transfer gear 82 previously mentioned. The main shaft 54 is oriented transverse to the output shaft 34 of the engine 22 and placed beneath the second gear 72 of the transverse gear pairing 52. Referring to FIGS. 3, 4, 12 and 13, the main shaft 54 includes sleeves 84 having unsplined (i.e. smooth outer surface) 85 and splined sections 86. Sleeves 84 are driven by and in engagement with main shaft 54.

Figure 12:
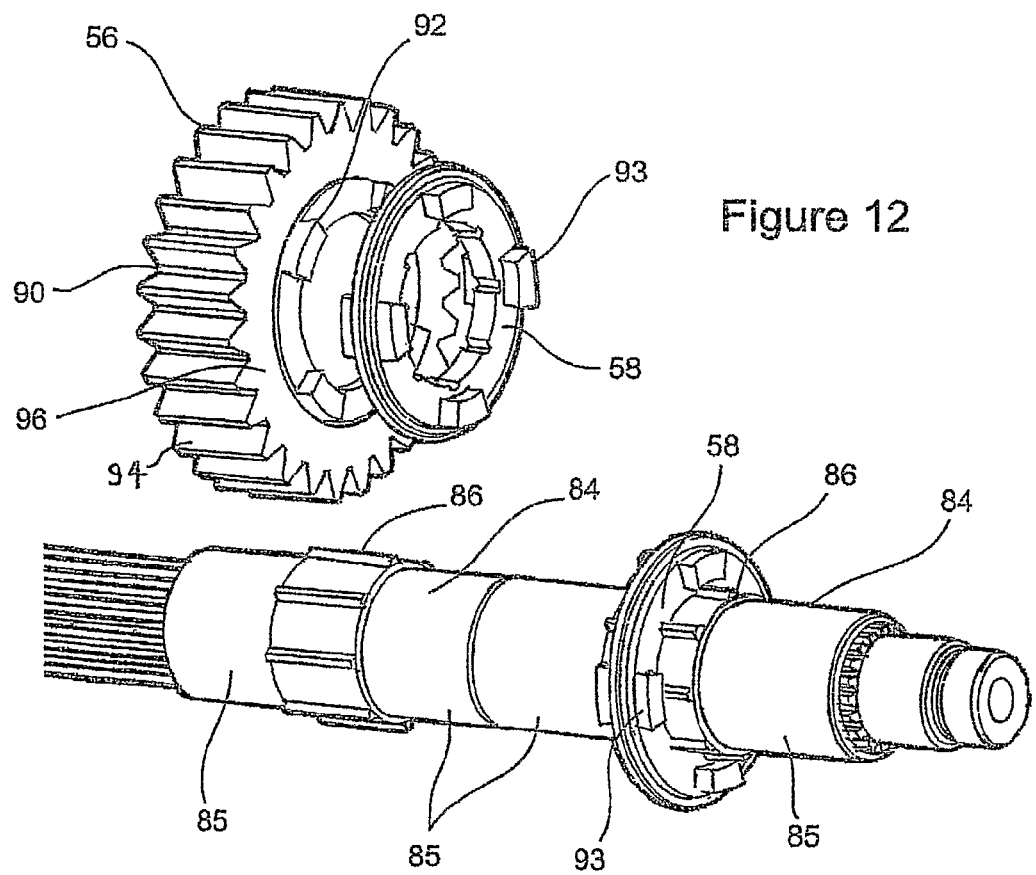
FIG. 12 is an exploded view of a gear and engagement dog upon a shaft; and a portion of the main shaft of FIG. 3.
Figure 13:
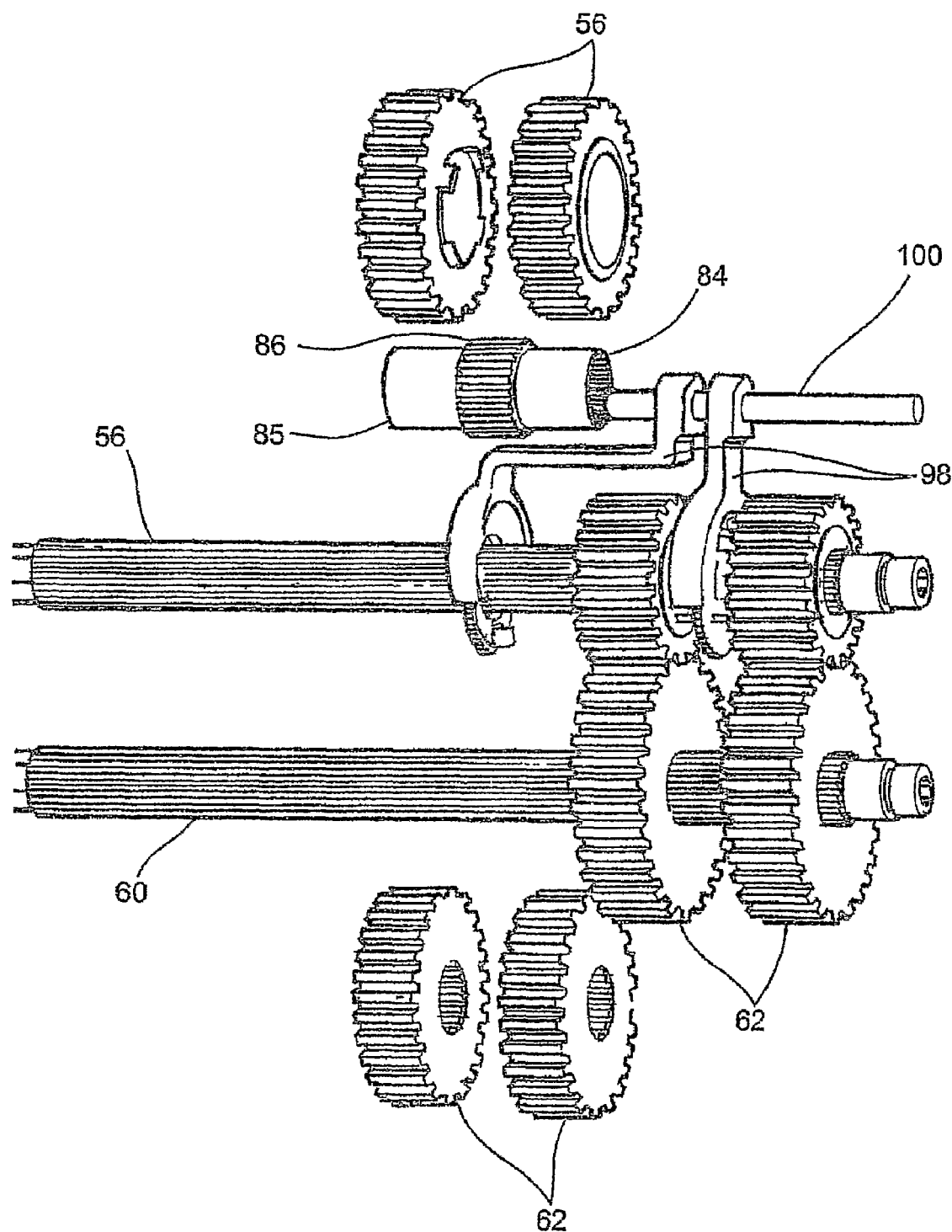
FIG. 13 is a view of a portion of the transmission of FIG. 3 with the left gear sets separated and pulled away.

The four driving speed gears 56 are located at an end of the main shaft 54 opposite the transfer gear 82 and are selectively engageable with the main shaft 54. Each driving speed gear 56 includes a set of peripheral teeth 90 and a set of receptors 92. The peripheral teeth 90 are upon the outer radial surface 94 of the gear 56 while the receptors 92 are upon the axial surface 96 of the gear 56. Referring to FIGS. 12 and 13, the driving gears 56 are supported and freely rotate on unsplined sections 85 of the sleeves 84. The engagement dogs 58 are supported upon and are axially slidable along splined sections 86 of the sleeves 84. Two engagement dogs 58 are located between the gear most proximate to the main shaft transfer gear 82 and an adjacent gear. Two further engagement dogs 58 are located between a gear most distant to the main shaft transfer gear 82 and an adjacent gear. The engagement dogs 58 include protruding ribs 93 and the dogs are slidingly engageable with the driving speed gears 56. More particularly, when a dog is slid into engagement, the ribs 93 of the dog engage the receptors 92 of the driving gear 56, thereby driving gear 56. The dogs 58 are moved by shift forks 98. The shift forks 98 are supported by a post 100 affixed to the transmission housing 42 and their movement is controlled by a conventional cable-type lever 102. It will be appreciated that other conventional means may be used to manipulate the position of dogs such as electric and hydraulic actuators.

A counter shaft 60 is located below and oriented parallel to the main shaft 54 and supports four driven gears 62 and an output gear 104. The counter shaft 60 has a length generally equivalent to the main shaft 54 and is supported by the transmission housing 42. The counter shaft 60 is driven by the main shaft 54. The driven gears 62 on the main shaft 54 are aligned with and continuously engaged with the counter shaft 60. The driven gears 62 are in constant engagement with the counter shaft 60. The driven speed gears 62 include teeth 106 upon outer radial surfaces 108. The counter shaft 60 also supports the output gear 104 at an end opposite that of the driven gears 62.

An idler gear 110 is supported on a stub shaft 112 adjacent to and below the counter shaft 60. The stub shaft 112 is oriented parallel to the counter shaft 60 and is supported by the transmission housing 42.

The transmission outlet shaft 64 is supported by the transmission housing 42 adjacent to and below the stub shaft 112 and supports an outlet gear 114. The transmission outlet shaft 64 is oriented parallel to the main shaft 54 and countershaft 60 of the transmission 24 and extends outside of the transmission housing 42 on both ends. The outlet gear 114 is continuously engaged with the idler gear 110 supported on the stub shaft 112.

The blade drive system includes the resettable overload clutch 130 that is located between the engine output shaft 34 and the transverse gear pairing 52.

Support bearings 116 are affixed to the exterior of the transmission housing 42 adjacent to the outlet shaft 64. The support bearings 116 abut the housing 42 and support the outlet shaft 64.

Referring to FIG. 2, a saw blade 26 is affixed to one end of the transmission outlet shaft 64. A radial axis defined by the saw blade 26 is parallel to an axis A-A defined by the length of the saw frame 28. The saw 20 also includes operational systems that are known or conventional in the art. These systems include a locomotion system that drives wheels 124 supporting the saw frame 28 at a desired speed. A lift system 126 is also included that is able to tilt the saw frame 28. When tilted the saw blade 26 may be taken out of contact with the substrate being cut. The saw 20 includes an engine mounting system that minimizes vibration within the frame. The saw 20 also includes a conventional speed selection lever 128 for controlling the speed of advancement of the saw.

The engine 22 is mounted upon the saw frame 28. The transmission housing 42 is affixed to the engine 22 such that the output shaft 34 of the engine 22 enters the transmission housing 42. The transmission housing 42 is also supported on supports 51. The configuration of the transmission 24, as previously described, changes the direction of an axis "A-A" representing rotational motion and torque generated by the engine 22 about ninety degrees. Additionally, the vertical position of the rotational axis is moved downward to an axis "B-B".

The engine 22 drives the transmission and indirectly, the saw blade 26. The output shaft 34 of the engine 22 is in rotational communication with the first gear 70 of the transverse gear 52 pairing via the engine's flywheel 66. The transverse gear pairing 52 changes the axis of the rotational motion provided by the engine 22 ninety degrees. The second gear 72 of the transverse gear pairing 52 is rotated by the first gear 70. The transfer gear 80 on the shaft 74 supporting the second gear 72 of the transverse gear pairing 52 drives a main shaft transfer gear 82 of the transmission 24. The main shaft 54 and the driving gears 56 thereon work in conjunction with the countershaft 60 to vary the speed of the outlet shaft 64 of the transmission 24.

The driving speed gears 56 on the main shaft 54 are continuously engaged with the driven speed gears 62 on the counter shaft 60. However, the driving speed gears 56 slip upon the sleeves 84 unless the engagement dogs 58, that are splined to the splined portion of the sleeves 84, are slid into engagement with the driving gears 56. Only one engagement dog 58 is engaged at a time. To which gear the engagement dog 58 is engaged determines the speed of the counter shaft 60 with respect to the main shaft 54. The engagement dogs 58 are moved into and out of engagement by the shift forks 98. The transmission 24 provides multiple output speeds.

The engagement of the dogs 58 with the driving gears 56 is performed sequentially. For example, a gear numbered three must be accessed after a gear numbered two. The progression continues through the entire driving gear set 56. The transmission 24 includes a neutral state when none of the engagement dogs 58 are engaged with a driving gear 56. The gear progression is as follows: neutral (when no dogs are in engagement with a driving gear), first gear, second gear, third gear, fourth gear.

Shifting from a first gear to a second gear is performed while the transmission main shaft 54 is in rotational communication with the engine output shaft 34 and the transmission main shaft 54 is in rotational communication with the counter shaft 60. This is referred to as on-the-fly shifting.

Figure 4:
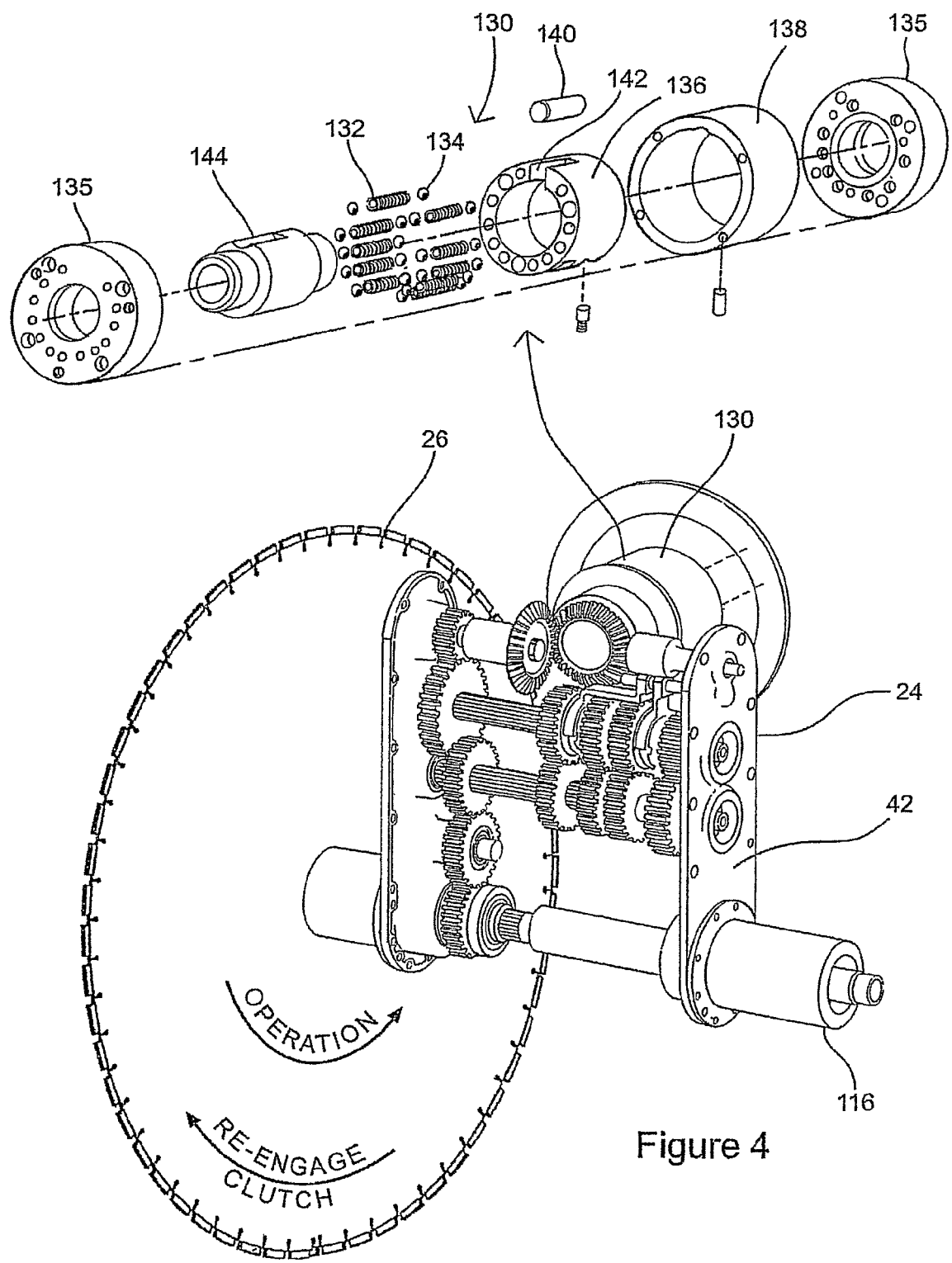
FIG. 4 is a perspective view of the transmission and saw blade, particularly showing an exploded view of the resettable clutch.

Preferably, saw 20 includes some type of dampening mechanism that interrupts direct communication between the engine 22 and saw blade 26 when the blade encounters significant predetermined resistance. Referring to FIG. 4, there is shown a resettable clutch 130 that is in continuous engagement under normal operating conditions. However, when the saw blade 26 encounters rotational resistance beyond a desired level, the clutch 130 actuates and totally interrupts rotational communication between the engine output shaft 34 and the first gear 70, thus, interrupting rotational communication between the saw blade 26 and the transmission 24. It is possible to place the clutch 130 in a different location, for example on counter shaft 60, however, it is preferable to locate clutch 130 as shown in order to maintain the same torque for different output speeds.

Resettable clutch 130 is commercially available from various sources including American Autogard Corp. of Rockford, Ill., and Cabat Inc. of Racine, Wis. Such a clutch 130 is disclosed in U.S. Pat. No. 3,893,553 which is hereby incorporated by reference. Generally, such clutch 130 includes a plurality of springs 132 that load balls 134 in an engaged position relative to end caps 135. A torque overload, of predetermined load, causes the balls 134 to retract into the rotor 136, allowing the rotor to rotate relative to housing 138. With about 15° of rotation, the drive key 140 escapes into the recess 142 in the housing, allowing the hub 144 to rotate freely without ratcheting the balls 134. Re-engagement is accomplished by reversing the relative rotation. Specifically, the clutch 130 is re-engaged by rotating the saw blade 26 in a reverse direction for less than one full revolution. Some resettable clutches employ resetting functions that are independent of the connection and the present invention contemplates the use of such devices.

It will be appreciated that a resettable clutch may also be incorporated into a conventional saw that employs belts or polychains such as in the saw shown in U.S. Pat. No. 6,318,353 the disclosure of which is incorporated herein by reference. In the saw of the '353 patent a resettable overload clutch 130 could be incorporated between the engine output shaft and the drive sprockets.

Figure 4A:
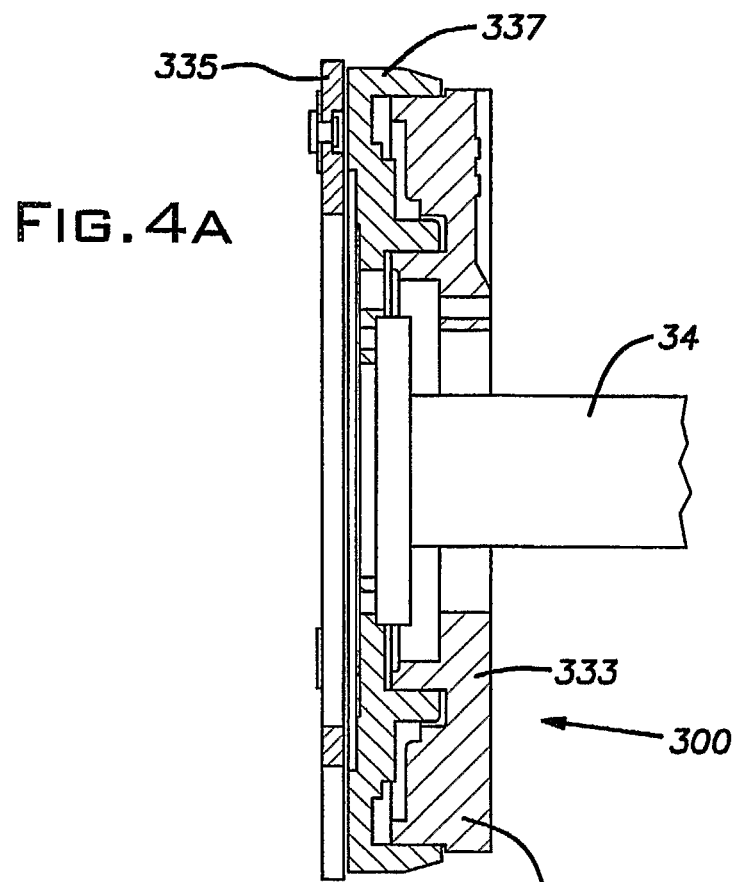
FIG. 4A is a cross-sectional schematic view of an electric clutch suitable for use in the present invention.

As shown in FIG. 4A the dampening mechanism may comprise a conventional electric clutch 300 mounted between the engine output shaft 34 and the first gear 70. A sensor 331 would be provided on engine 22 such that when the saw blade 26 encounters rotational resistance beyond a desired level and the engine slows at a predetermined rate, stationary field coil 333 is de-energized thus allowing armature assembly 335 which is in rotational communication with first gear 70 to move freely from the rotor assembly 337 which is in rotational communication with engine output shaft 34. Re-engagement is accomplished by an operator simply re-establishing the electric field on coil 333 thereby bringing rotor 337 and armature 335 back into direct communication.

Figure 4B:
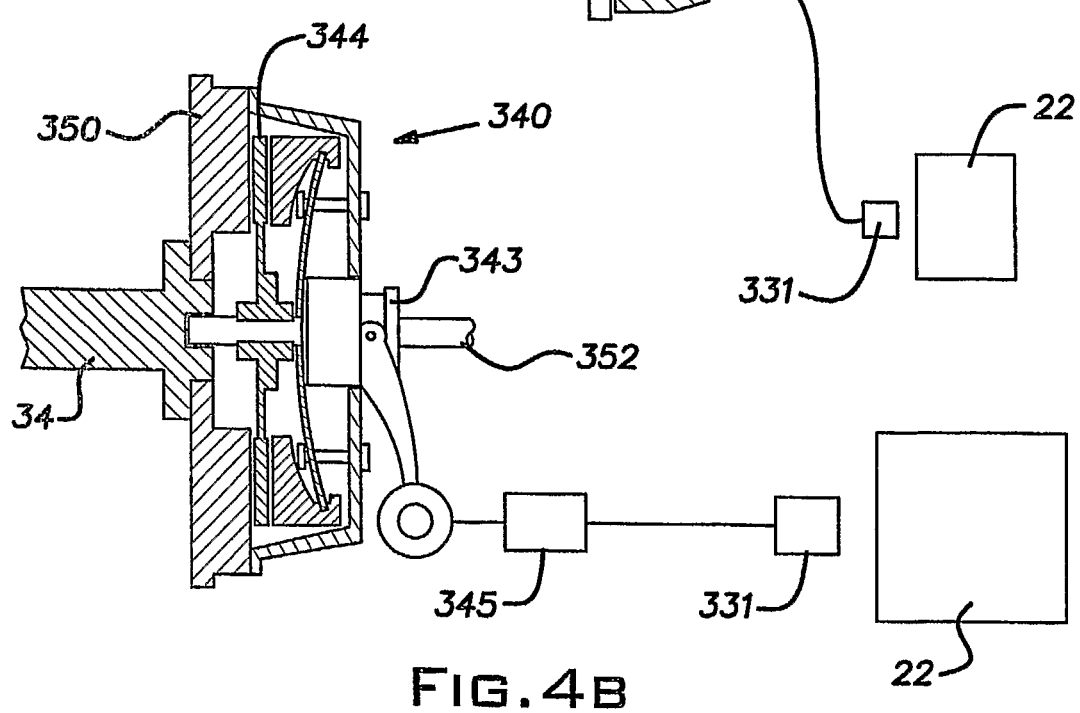
FIG. 4B is a cross-sectional schematic view of a conventional friction clutch suitable for use in the present invention.

As shown in FIG. 4B the dampening mechanism may comprise a conventional friction clutch 340 mounted between the engine output shaft 34 and the first gear 70. Like electric clutch 300, friction clutch 340 would be automatically disengaged by a sensor 331 that detects a sudden predetermined drop in engine 22 speed. Throw-out bearing assembly 343 may be moved so as to bring clutch plate 344 in and out of engagement by any one of a number of conventional means such as by using a hydraulic or pneumatic activator 345 that is actuated by sensor 331, so as to disengage and engage rotational communication between the clutch flywheel 350 connected to output shaft 34 on engine 22 and the clutch shaft 352 connected to first gear 70.

Figure 4C:
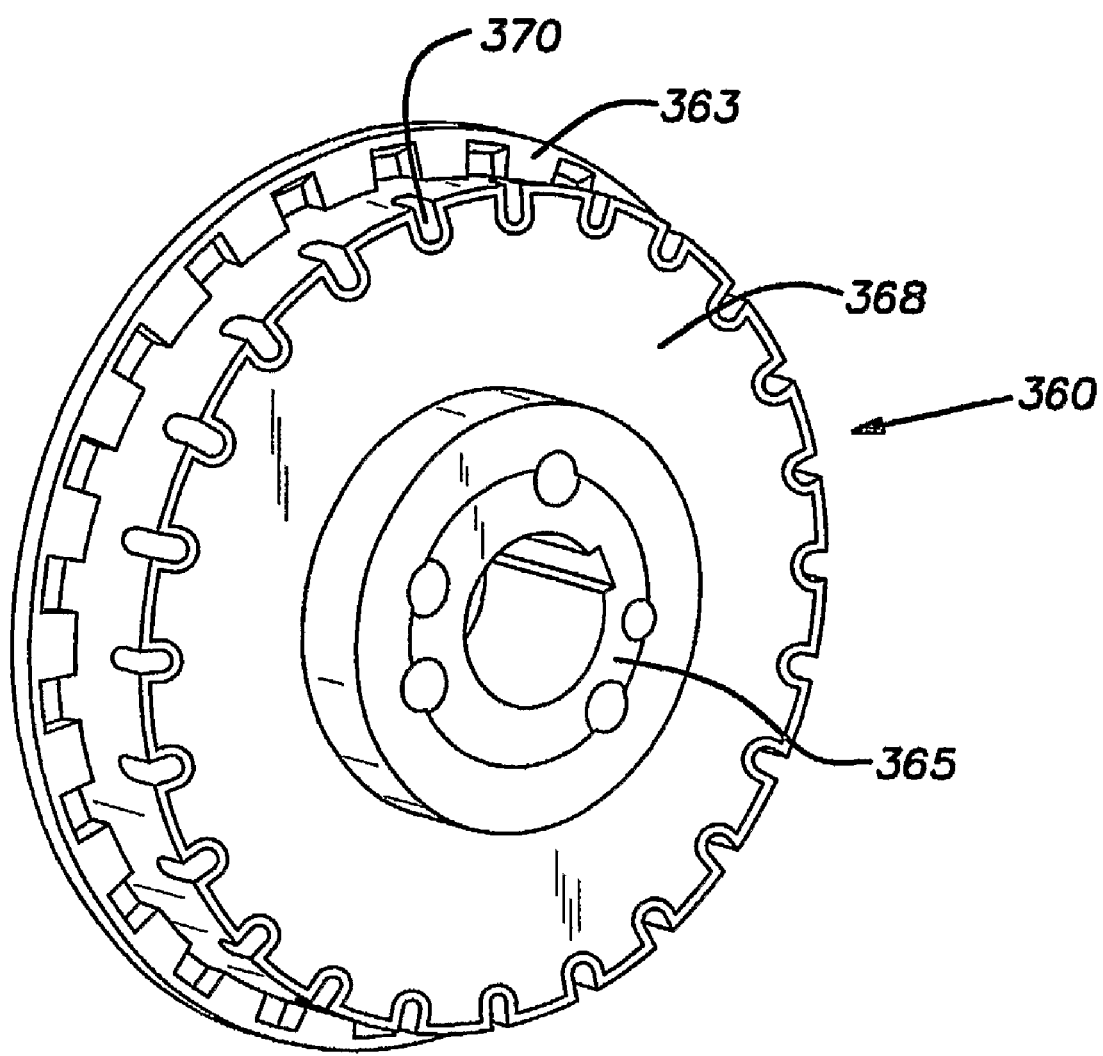
FIG. 4C is a perspective schematic view of a flexible rubber coupling suitable for use in the present invention.

As shown in FIG. 4C the dampening mechanism may also comprise a flexible rubber coupling 360 comprising an outer wheel 363 which is rotationally attached to first gear 70 and an inner hub 365 that is attached to engine 22 output shaft 34. Connecting hub 365 to wheel 363 is a flexible rubber disk 368 that is capable of absorbing tremendous energy when the saw blade 26 encounters unexpected rotational resistance, thereby protecting the blade 26 and transmission 24 from possible damage due to a sudden high load being placed on the saw. In an extreme loading situation it may be possible for disk 368 to slip relative to the teeth 370 formed in wheel 363 thus allowing hub 365 to move slightly independent of wheel 363. Flexible rubber couplings suitable for use in the present invention are available from the Ringfeder Corporation of Westwood, N.J., under the trade name ARCUSAFLEX™.

It will be appreciated that the gear types upon the main shaft 54 and counter shaft 60 may be reversed. That is, the counter shaft 60 may include driven 62 gears that are selectively engaged with the counter shaft 60 via engagement dogs 58 while the main shaft driving gears 56 are in continuous engagement with the main shaft 54.

The components described above may be arranged in a number of functional permutations as shown in FIGS. 5-11.

Figure 5:
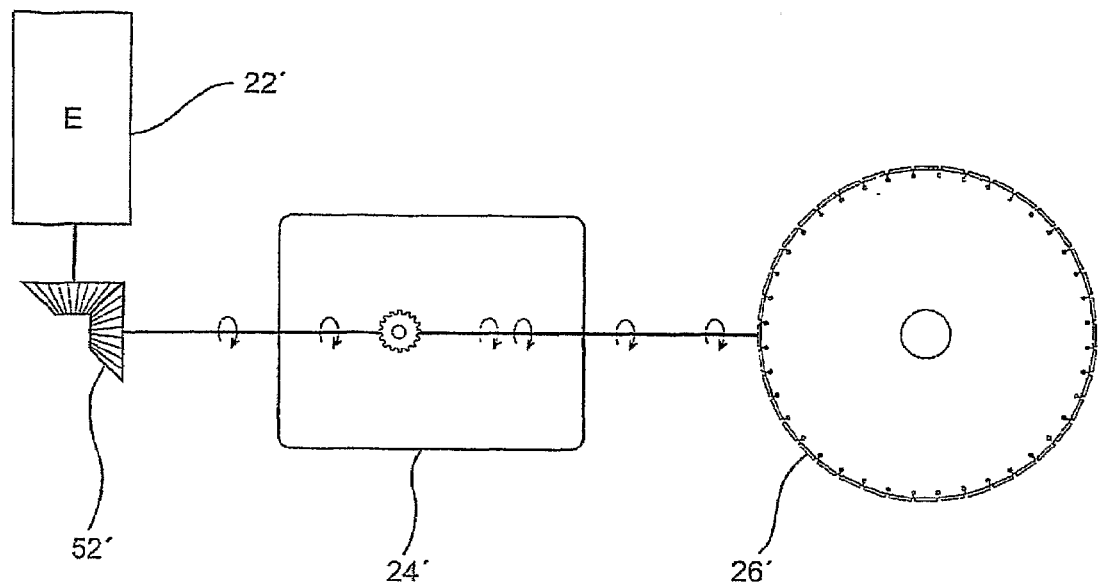
FIG. 5 is a schematic representation of a first embodiment of the invention.
Figure 6:
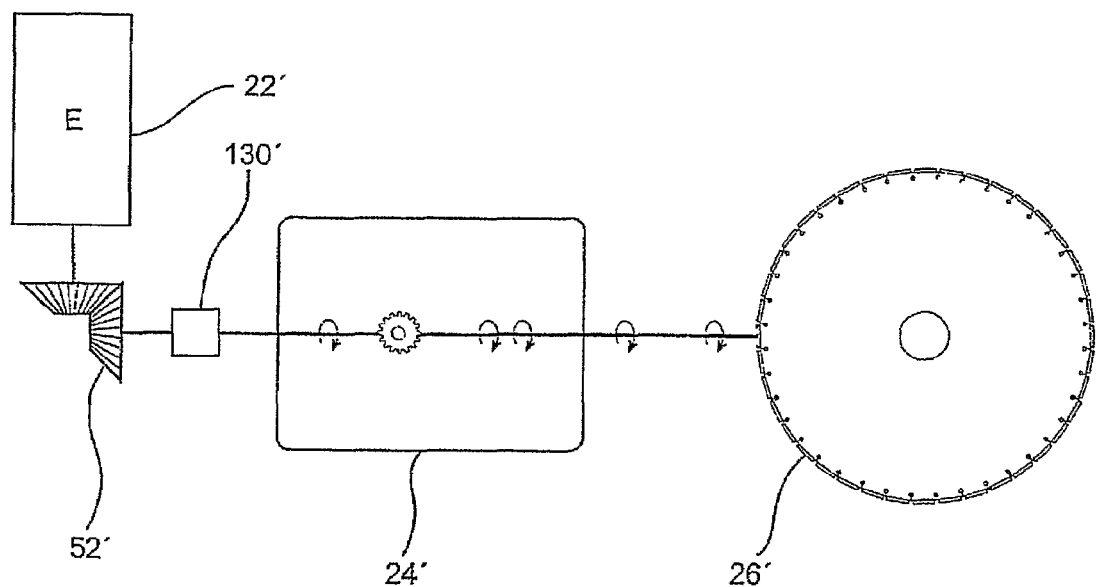
FIG. 6 is a schematic representation of a second embodiment of the invention.
Figure 7:
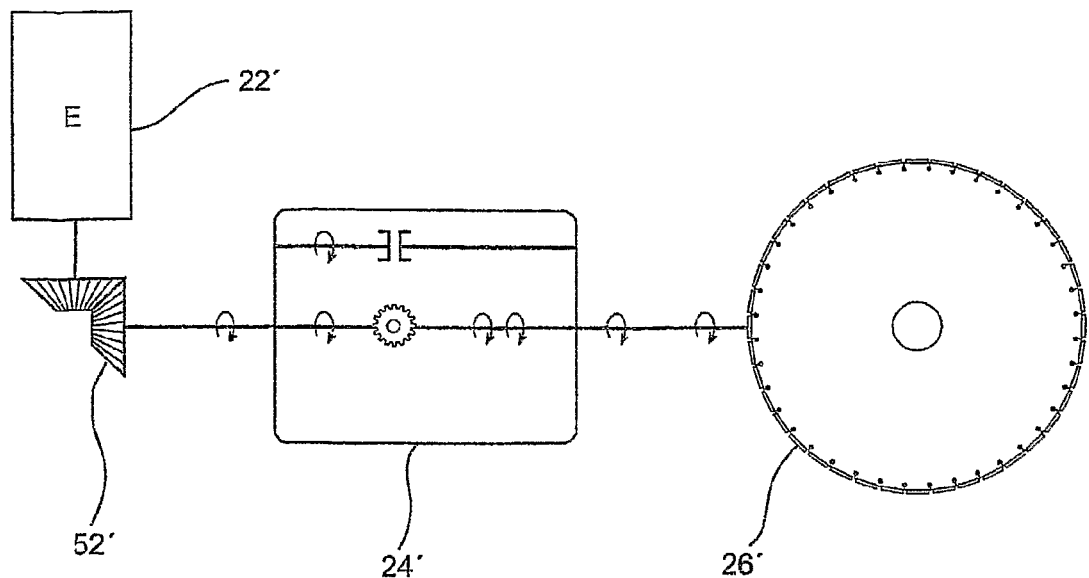
FIG. 7 is a schematic representation of a third embodiment of the invention.
Figure 8:
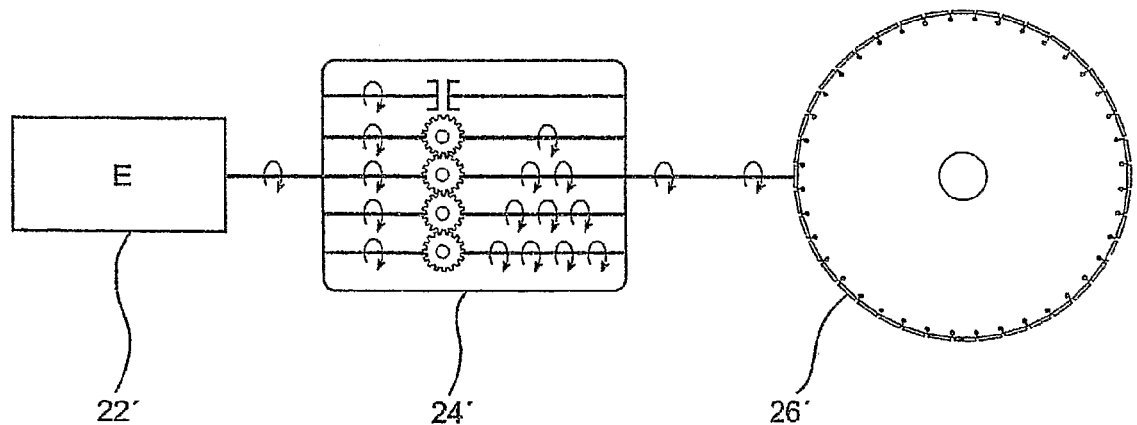
FIG. 8 is a schematic representation of a fourth embodiment of the invention.
Figure 9:
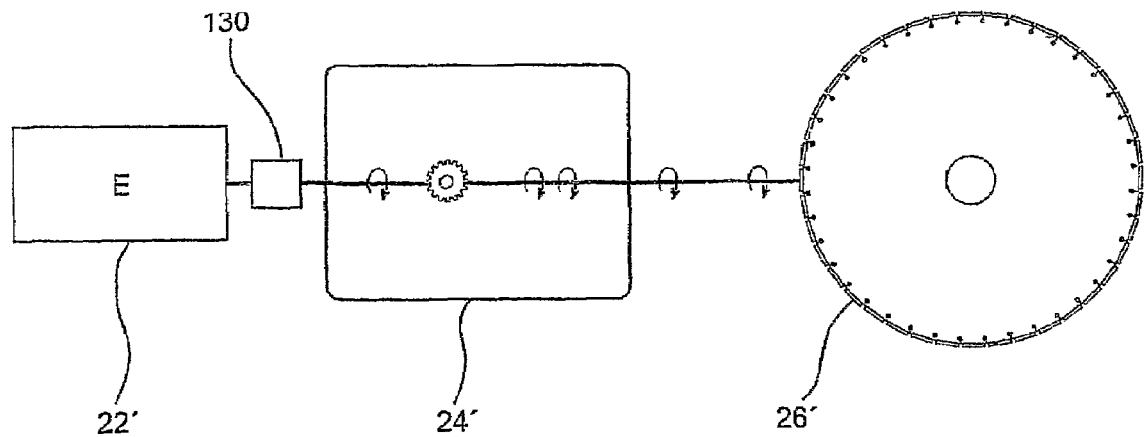
FIG. 9 is a schematic representation of a fifth embodiment of the invention.
Figure 10:
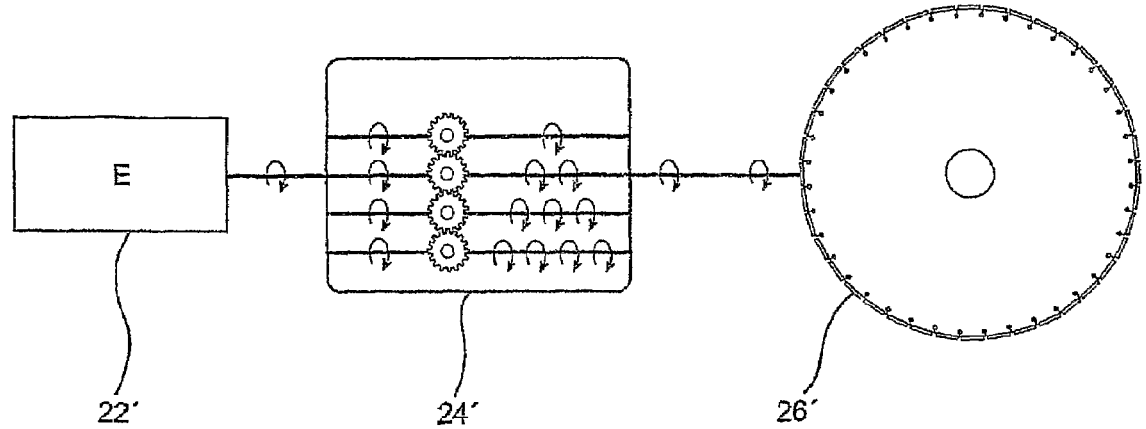
FIG. 10 is a schematic representation of a sixth embodiment of the invention.
Figure 11:
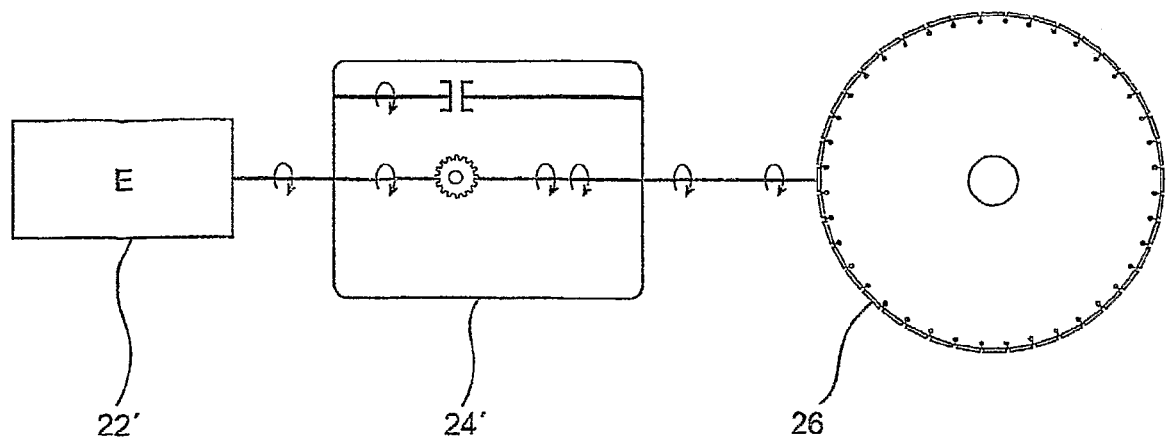
FIG. 11 is a schematic representation of a seventh embodiment of the invention.

Specifically, FIG. 5 schematically illustrates a saw including an engine 22', a transverse gear pairing 52', a transmission 24' that is beltless and a saw blade 26'. In this embodiment, transmission 24' merely provides a single speed with no neutral. FIG. 6 shows a saw including an engine 22', a transverse gear pairing 52', a transmission 24' and a saw blade 26'. Transmission 24' provides a single speed and a dampening mechanism 130' is provided. Dampening mechanism 130' may comprise a resettable overload clutch, a friction clutch, an electric clutch or flexible rubber coupling. FIG. 7 shows a saw including an engine 22', a transverse gear pairing, a transmission 24 that is beltless and includes a neutral gear or position, and a saw blade 26'. FIG. 8 shows a saw including an engine 22', a transmission 24' that is beltless and a variable speed type with neutral, and a saw blade 26'. In the saw of FIG. 8 there is no transverse gear pairing and thus the major axis of the engine is transverse to the cutting planes of the blade 26'. FIG. 9 shows a saw including an engine 22', a transmission 24', a resettable clutch 130' and a saw blade 26'. The saw of FIG. 9 would be configured like the saw of FIG. 8, the major axis of the engine being transverse to the cutting plane of the blade 26'. FIG. 10 shows a saw configured like the saw of FIG. 8 including an engine 22', a transmission 24' that is a variable speed type, and a saw blade 26'. FIG. 11 shows a saw configured like the saw of FIG. 8 including an engine 22', a transmission that is beltless and includes a neutral gear, and a saw blade.

The saw of the present invention does not rely upon belt and pulley drives, wherein the belts must be replaced and/or re-tensioned regularly. The transmission of the saw may be shifted sequentially while the saw is in operation, without the use of a clutch. The transmission of the saw of the present invention also includes a neutral setting or position wherein the saw may be propelled (i.e., for safe maneuvering out of the cut) without the saw blade turning. It will be appreciated that in addition to the walk-behind saw shown in FIG. 1, the principles of the present invention may be readily applied to a riding saw as shown in U.S. Pat. No. 5,724,956 the disclosure of which is incorporated herein by reference.

While the invention has been shown and described with respect to a specific embodiment thereof, this is for the purpose of illustration rather than limitation, and other variations and modifications of the specific device herein shown and described will be apparent to those skilled in the art all within the intended spirit and scope of the invention. Accordingly, the patent is not to be limited in scope and effect to the specific embodiments herein shown and described, or in any other way that is inconsistent with the extent to which the progress in the art has been advanced by the invention.

What is claimed:

1. A mobile road or floor saw comprising:
   a generally rectangular frame having a front end, a rear end and a longitudinal length;
   a prime mover supported by said frame and including a rotational output shaft aligned generally with the longitudinal length of said frame;
   a gear drive driven by said prime mover rotational output shaft, said gear drive having an transfer gear shaft in rotational communication with a transmission main shaft and wherein said transfer gear shaft is oriented transverse to said prime mover rotational output shaft;
   a beltless transmission including said main shaft and an outlet shaft wherein said outlet shaft is in rotational communication with a saw blade;
   and a dampening mechanism that interrupts rotational communication between said prime mover rotational output shaft and said saw blade when said saw blade encounters a predetermined degree of rotational resistance.

2. The mobile road or floor saw of claim 1 wherein said transmission is a multi-speed transmission.

3. The mobile road or floor saw of claim 2 wherein said main shaft of said beltless multi-speed transmission is selectively interruptable from said outlet shaft of said beltless multi-speed transmission so as to provide a neutral position.

4. The mobile road of floor saw of claim 2 wherein said beltless multi-speed transmission further comprises:
   a first drive gear selectively driving a first driven gear, said first drive gear in rotational communication with said transmission main shaft and said first driven gear in rotational communication with said transmission outlet shaft;
   a second drive gear selectively driving a second driven gear, said second drive gear in rotational communication with said transmission main shaft and said second driven gear in rotational communication with said transmission outlet shaft;
   whereby a selection of said second drive gear to drive said second driven gear and concurrent de-selection of said first gear to drive said first driven gear is effectuated during continuous driving of said transmission main shaft by said gear drive output shaft.

5. The mobile road of floor saw of claim 4 wherein said beltless multi-speed transmission further includes:
   a third drive gear selectively driving a third driven gear, said third drive gear in rotational communication with said transmission main shaft and said third driven gear in rotational communication with said transmission outlet shaft;
   whereby a selection of said second drive gear to drive said second driven gear is effectuated only with concurrent de-selection of said first drive gear to drive said first driven gear; and
   a selection of said third drive gear to drive said third driven gear is effectuated only with concurrent de-selection of said second drive gear to drive said second driven gear.

6. A mobile road or floor saw comprising:
   a generally rectangular frame having a front end and a rear end;
   a prime mover supported by said frame and including a rotational output shaft;
   a transmission including a main shaft in rotational communication with said prime mover rotational output shaft and an outlet shaft wherein said outlet shaft is in rotational communication with a saw blade; and
   a dampening mechanism that interrupts direct rotational communication between said prime mover rotational output shaft and said saw blade when said saw blade encounters a predetermined degree of rotational resistance.

7. A mobile road or floor saw comprising:
   a generally rectangular frame having a front end and a rear end;
   a prime mover supported by said frame and including a rotational output shaft aligned generally with the length of said frame;
   a gear drive driven by said prime mover rotational output shaft, said gear drive having an transfer gear shaft in rotational communication with a transmission main shaft and wherein said transfer gear shaft is oriented transverse to said prime mover rotational output shaft; and a transmission including said main shaft and an outlet shaft wherein said main shaft of said transmission is a selectively interruptable from said outlet shaft of said transmission and wherein said outlet shaft is in rotational communication with a saw blade;

wherein said transmission further comprises a dampening mechanism that interrupts direct rotational communication between said prime mover rotational output shaft and said saw blade when said saw blade encounters a predetermined degree of rotational resistance.

8. The mobile road or floor saw of claim 7 wherein said transmission is a multi-speed beltless transmission.

9. A mobile road or floor saw comprising:
a generally rectangular frame having a front end and a rear end;
a prime mover supported by said frame and including a rotational output shaft aligned generally with the length of said frame;
a gear drive driven by said prime mover rotational output shaft, said gear drive having an transfer gear shaft in rotational communication with a transmission main shaft and wherein said transfer gear shaft is oriented transverse to said prime mover rotational output shaft;

a transmission including a main shaft and an outlet shaft wherein said outlet shaft is in rotational communication with a saw blade; and a dampening mechanism that interrupts direct rotational communication between said prime mover rotational output shaft and said saw blade when said saw blade encounters a predetermined degree of rotational resistance.

10. The mobile road or floor saw of claim 9 wherein said transmission is a multi-speed beltless transmission.

11. The mobile road or floor saw of claim 10 wherein said main shaft of said beltless multi-speed transmission is a selectively interruptable from said outlet shaft of said beltless multi-speed transmission so as to provide a neutral position.

12. The mobile road or floor saw as set forth in claim 9 wherein said prime mover comprises a power source selected from the group consisting of a gasoline engine, a diesel engine, a propane engine and an electric motor.

13. The mobile road or floor saw as set forth in claim 9 wherein said dampening mechanism is a resettable disengagement mechanism.

14. The mobile road or floor saw as set forth in claim 9 wherein said dampening mechanism is a mechanism selected from the group consisting of a resettable overload clutch, an electric clutch, a friction clutch and a flexible rubber coupling.

* * * * *